(12) United States Patent
Schroeder et al.

(10) Patent No.: US 6,650,110 B2
(45) Date of Patent: Nov. 18, 2003

(54) TARGET WHEEL SENSOR ASSEMBLY FOR PRODUCING AN ASYMMETRIC SIGNAL AND FOR DETERMINING THE DIRECTION OF MOTION OF THE TARGET WHEEL BASED ON THE SIGNAL SHAPE

(75) Inventors: Thaddeus Schroeder, Rochester Hills, MI (US); Bruno Patrice Bernard, Troy, MI (US); Avoki M. Omekanda, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/873,871

(22) Filed: Jun. 4, 2001

(65) Prior Publication Data

US 2002/0180426 A1 Dec. 5, 2002

(51) Int. Cl.$^7$ .................................................. G01B 7/30
(52) U.S. Cl. .............................. 324/207.22; 324/207.25
(58) Field of Search ........................ 324/207.11, 207.22, 324/173, 174, 165, 207.21, 207.25; 123/617

(56) References Cited

U.S. PATENT DOCUMENTS 3,969,677 A * 7/1976 Woyton ........................ 327/29
4,142,153 A * 2/1979 Smith .......................... 324/165
4,370,614 A * 1/1983 Kawada et al. .............. 324/173
5,086,272 A * 2/1992 Hinrichsen ............... 324/207.13
6,208,131 B1 * 3/2001 Cebis et al. .................. 324/165

FOREIGN PATENT DOCUMENTS

DE 19814758 * 10/1999
JP 58-122406 * 7/1983

* cited by examiner

Primary Examiner—N. Le
Assistant Examiner—Reena Aurora
(74) Attorney, Agent, or Firm—Jimmy L. Funke

(57) ABSTRACT

A target wheel sensor assembly includes a sensor that is placed near a target wheel. The sensor includes a magnet to create a flux and a sensing element to sense changes in the flux as the target wheel rotates. The target wheel is alternatingly formed with multiple teeth and multiple slots. Each tooth includes a flat portion that is parallel to the bottom of the sensor and a chamfered portion contiguous to the flat portion. The chamfered portion forms an angle, α, with the bottom of the sensor. As the target wheel rotates, the shape of the teeth in conjunction with the slots cause the sensor to output an asymmetric signal. The shape of the signal is used to determine the direction of motion of the target wheel.

11 Claims, 3 Drawing Sheets

FLUX DENSITY WAVEFORM

TARGET WHEEL SENSOR ASSEMBLY FOR PRODUCING AN ASYMMETRIC SIGNAL AND FOR DETERMINING THE DIRECTION OF MOTION OF THE TARGET WHEEL BASED ON THE SIGNAL SHAPE

TECHNICAL FIELD

The present invention relates to motor vehicle sensors and actuators.

BACKGROUND OF THE INVENTION

Modern motor vehicles are equipped with numerous sensors which provide detailed information regarding the operation of the vehicle. This information may be displayed for a driver or it may be processed and provided to various vehicle control systems. A target wheel sensor, for example, may be used to determine the angular speed or angular position of a rotating part in the vehicle, e.g., a crankshaft and a driveshaft. In either case, a target wheel may be engaged with the rotating part for inducing signals in one or more sensors positioned next to the target wheel, with the signals representing the angular position or angular speed of the rotating part. These signals can be used in various control systems, e.g., an ignition system and a speed control system.

The present invention recognizes that certain applications require the detection of not only the position of the target wheel, but the detection of the direction of motion of the target wheel as well. Devices have been provided that can be used to detect the position of the target wheel and the direction of motion. These devices typically require a first sensor and a second sensor placed at a predetermined angular distance from each other around a target wheel. Unfortunately, the need for a second sensor increases the cost of the device.

The present invention has recognized these prior art drawbacks, and has provided the below-disclosed solutions to one or more of the prior art deficiencies.

SUMMARY OF THE INVENTION

A target wheel sensor assembly includes a sensor and a target wheel that is placed in close proximity to the sensor so that it is sensed by the sensor. The target wheel is configured so that as it rotates, it causes the sensor to output an asymmetric signal. In a preferred embodiment, the target wheel alternatingly forms plural teeth and plural slots. The teeth are configured so that they cause the sensor to output an asymmetric signal as the target wheel rotates.

Preferably, the sensor defines a bottom and each tooth forms a flat portion that is parallel to the bottom of the sensor. Each tooth also forms a chamfered portion that is contiguous to the flat portion. The chamfered portion forms an angle, α, with the bottom of the sensor. In a preferred embodiment, the angle, α, is between ten degrees and thirty degrees.

Preferably, the sensor defines a width and each tooth and slot define a pitch. In a preferred embodiment, the ratio of the slot width to the pitch is between 0.3 and 0.9. To ensure that the waveform of the signal output by the sensor is never close to zero, the ratio is between 0.4 and 0.7. Moreover, to yield a significant flux variation the ratio is between 0.7 and 0.9.

In another aspect of the present invention, a target wheel sensor assembly includes a target wheel and one and only one sensor placed in close proximity to the target wheel. The sensor senses the position of the target wheel and the direction of motion of the target wheel.

In still another aspect of the present invention, a system for determining the direction of rotation of a rotating target wheel includes a target wheel and a sensor placed in close proximity to the target wheel. As the target wheel rotates, the sensor outputs an asymmetric signal. This aspect of the present invention includes a circuit that is connected to the sensor. The circuit receives the asymmetric signal and detects different positive and negative peaks of the asymmetric signal to determine the direction of motion of the target wheel.

The present invention will now be described, by way of example, with reference to the accompanying drawings, in which:

DESCRIPTION OF AN EMBODIMENT OF THE INVENTION

Figure 1:
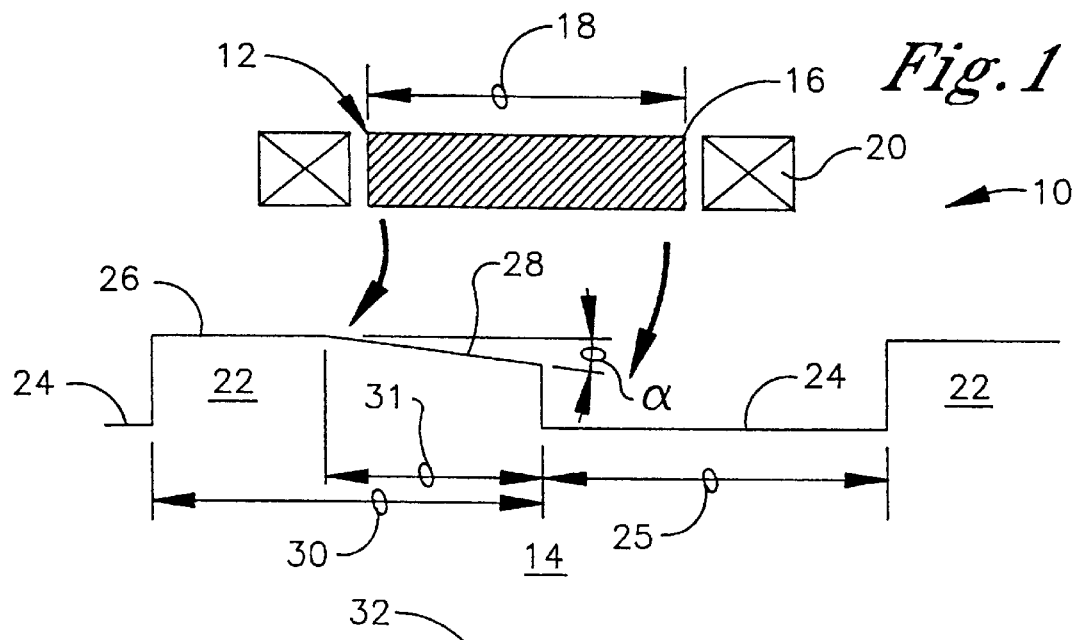
FIG. 1 is a plan view of a target wheel sensor assembly.

Referring initially to FIG. 1, a target wheel sensor assembly is shown and generally designated 10. FIG. 1 shows that the target wheel sensor assembly 10 includes a sensor 12, e.g., a variable reluctance (VR) sensor, placed in close proximity to a preferably metal target wheel 14. It is to be appreciated that the sensor 12 can be a Hall sensor, a semiconductor magnetoresistor (MR), a permalloy MR, or any other magnetic field sensor well known in the art.

As shown in FIG. 1, the sensor 12 includes a preferably permanent magnet 16 having a width 18. The magnet 16 is closely surrounded by a hollow, toroidal coil 20 of wire. FIG. 1 shows that the target wheel 14 is alternatingly formed with multiple teeth 22 and multiple slots 24. Each slot 24 has a length 25. Moreover, each tooth 22 includes a flat portion 26 that is parallel to the bottom of the magnet 16. Each tooth 22 also includes a chamfered portion 28 that is contiguous to the flat portion 26. The chamfered portion 28 forms an angle, α, with the bottom of the magnet 16. Additionally, the tooth 22 has an overall length 30 and a chamfer length 31. In a preferred embodiment, the angle, α, is between ten degrees (10°) and thirty-five degrees (35°). Moreover, the ratio (R) of the sensor width 18 to the tooth pitch is between three-tenths (0.3) and nine-tenths (0.9). It is to be understood that the tooth pitch is the sum of the tooth length 30 and the slot length 25.

To ensure that the waveform, described below, is never close to zero, the ratio (R) is between four-tenths (0.4) and seven-tenths (0.7). Moreover, to ensure a significant flux variation the ratio (R) is between seven-tenths (0.7) and nine-tenths (0.9). With a tooth pitch of fourteen millimeters (14 mm), the preferred chamfer length 31 is between five millimeters (5 mm) and eleven millimeters (11 mm).

As the target wheel 14 rotates, as described below, the slots 24 and teeth 22 alternatingly move past the sensor 12. The configuration of the target wheel 14, described above, causes the sensor 12 to output a signal having a distinctly asymmetric waveform that is used to detect the direction of motion of the target wheel 14.

Figure 2:
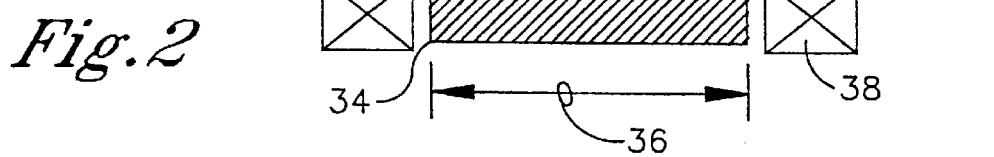
FIG. 2 is a plan view of a first alternate sensor.

FIG. 2 shows an alternative sensor generally designated 32. The sensor 32 shown in FIG. 2 includes a magnet 34 having a width 36. A hollow toroidal coil 38 of wire closely surrounds the magnet. As shown in FIG. 2, the magnet 34 and the coil 38 are backed by a preferably steel plate 40 that facilitates flux return toward the coil 38. It is to be understood that the sensor 32 shown in FIG. 2 can be used in conjunction with the target wheel 14 shown in FIG. 1 to create a signal having the asymmetric waveform necessary to detect the direction of motion of the target wheel 14. It is also to be understood that when placed in proximity to the target wheel 14, the sensor 32 is placed so that the steel plate 40 is opposite the target wheel 14, i.e., as the target wheel 14 rotates the teeth 22 and slots 24 are closest to the magnet 34.

Figure 3:
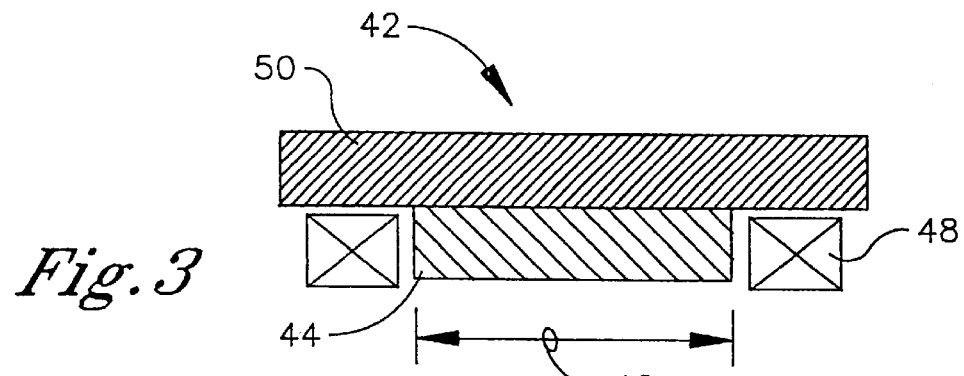
FIG. 3 is a plan view of a second alternate sensor.

Referring now to FIG. 3, a second alternative sensor is shown and generally designated 42. The sensor 50 shown in FIG. 3 includes a preferably steel pole 44 closely surrounded by a hollow toroidal coil 48 of wire. As shown, the steel pole 44 has a width 46. Moreover, the steel pole 44 and the coil 48 are backed by a preferably permanent magnet 50. It is to be understood that the steel pole 44 helps guide the flux toward the coil 48. It is also to be understood that the sensor 42 shown in FIG. 3 can be used in conjunction with the target wheel 14 shown in FIG. 1 to create a signal having the asymmetric waveform necessary to detect the direction of motion of the target wheel 14. Moreover, it is to be understood that when placed in proximity to the target wheel 14, the sensor 42 is placed so that the magnet 50 is opposite the target wheel 14, i.e., as the target wheel 14 rotates the teeth 22 and slots 24 are closest to the steel pole 44.

Figure 4:
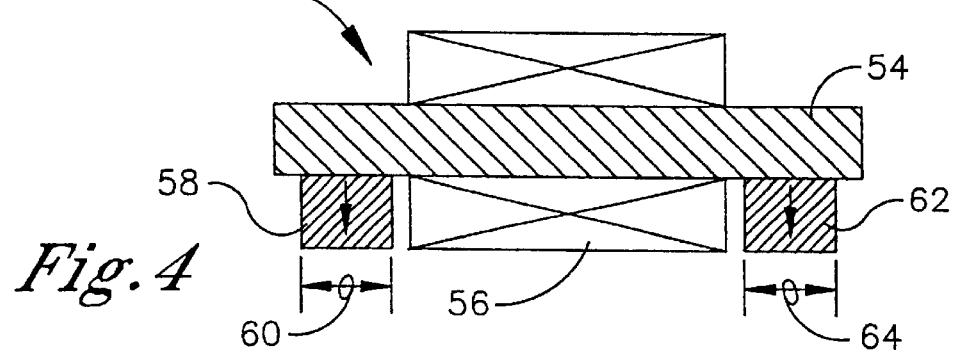
FIG. 4 is a plan view of a third alternative sensor.

FIG. 4 shows yet another alternative sensor generally designated 52 that can be used in conjunction with the target wheel 14, shown in FIG. 1, to create a signal having the asymmetric waveform necessary to determine the direction of motion of the target wheel 14. As shown in FIG. 4, this sensor 52 includes a preferably steel piece 54, e.g., a rod, plate, etc., around which a hollow toroidal coil 56 of wire is disposed. A first magnet 58 having a width 60 and a second magnet 62 having a width 64 are placed on each side of the coil 56. It is to be understood that when placed in proximity to the target wheel 14, the sensor 52 is placed so that as the target wheel 14 rotates the teeth 22 and slots 24 are closest to the magnets 58, 62.

Figure 5:
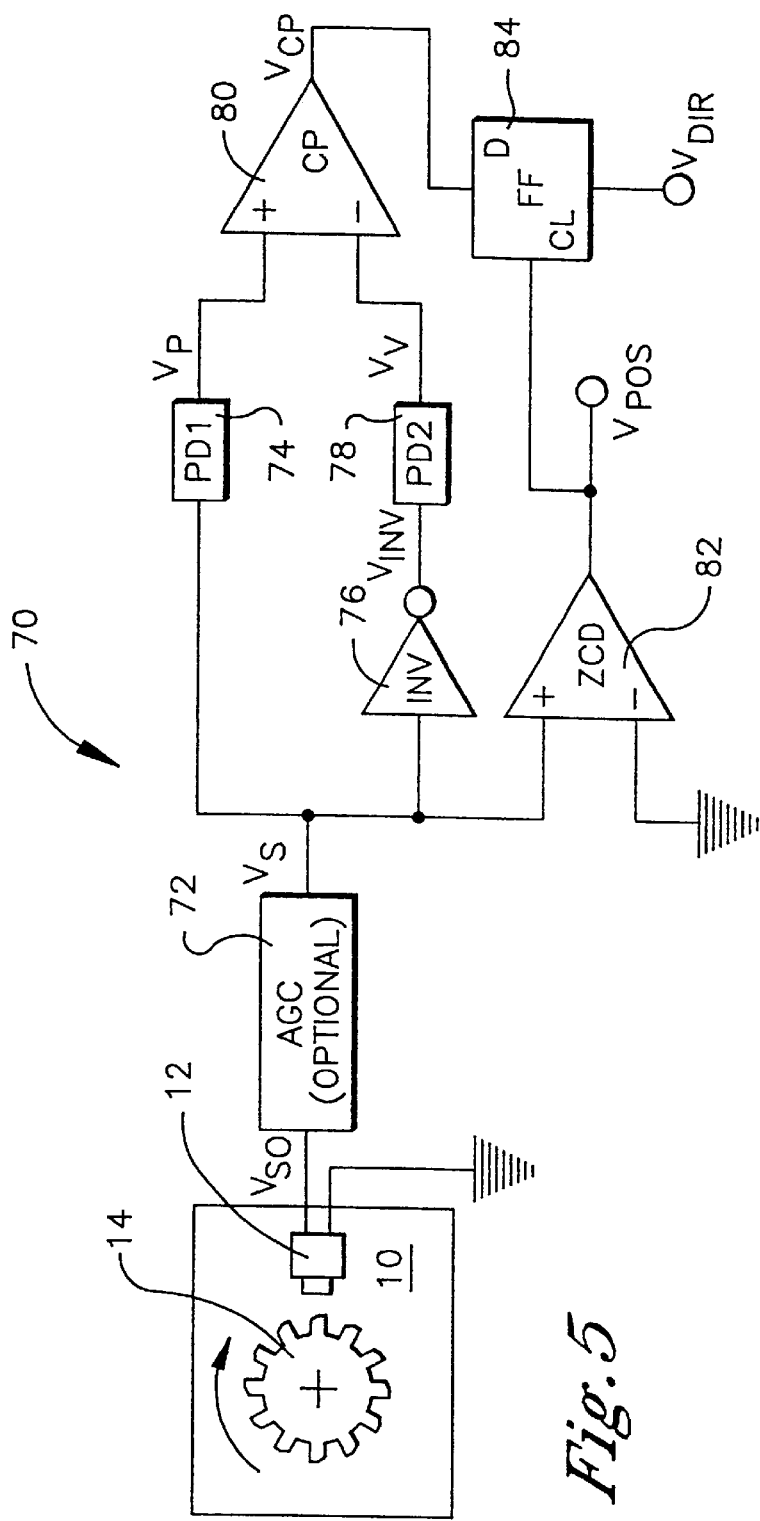
FIG. 5 is a diagram of a circuit for comparing positive and negative signal peaks from the target wheel sensor assembly.

Referring now to FIG. 5, a circuit for comparing positive and negative signal peaks is shown and generally designated 70. FIG. 5 shows that the target wheel sensor assembly 10, specifically the sensor 12, is connected to an automatic gain control (AGC) 72 so that the signal from the sensor 12 initially passes through the AGC 72. It is to be appreciated that the target wheel sensor assembly 10 can include any of the above described sensors 12, 32, 42, 52 and as such, any of the sensors 12, 32, 42, 52 may be connected to the AGC 72. It is also to be appreciated that the AGC 72 is optional. However, in a preferred embodiment, the sensor 12 is a VR sensor and as such, the signals from the sensor 12 vary with the speed of the target wheel 14. Thus, the AGC 72 is advantageous because it compensates for the variations in the signals from the sensor 12.

FIG. 5 also shows that the circuit includes a first peak detection circuit (PD1) 74 that is parallel to a signal inverter (INV) 76 and a second peak detection circuit (PD2) 78. As shown, the signal inverter 76 is connected in series to the input of the second peak detection circuit (PD2). FIG. 5 shows that the outputs of the peak detection circuits 74, 76 are connected to a comparator circuit (CP) 80. Moreover, the peak detection portion of the circuit 70 is parallel to a zero crossing detection circuit (ZCD) 82. The outputs of the comparator circuit 80 and the zero crossing detection circuit 82 are connected to a flip-flop circuit 84.

The circuit 70 is reset each time a rising edge zero crossing in the signal is detected by the zero crossing detection circuit 82. Then, the signal peak is detected and stored by the first peak detection circuit 74. After the signal is inverted by the inverter 76, the valley is detected by the second peak detection circuit 78. The comparator circuit 80 determines the difference between the absolute values of the positive and negative peaks and the result is stored in the flip-flop circuit 84. A positive difference corresponds to clockwise rotation of the target wheel 14 and a negative difference corresponds to counterclockwise rotation of the target wheel 14 (or vice versa). The flip-flop circuit 84 outputs a signal representative of the direction of motion of the target wheel 14.

Figure 6:
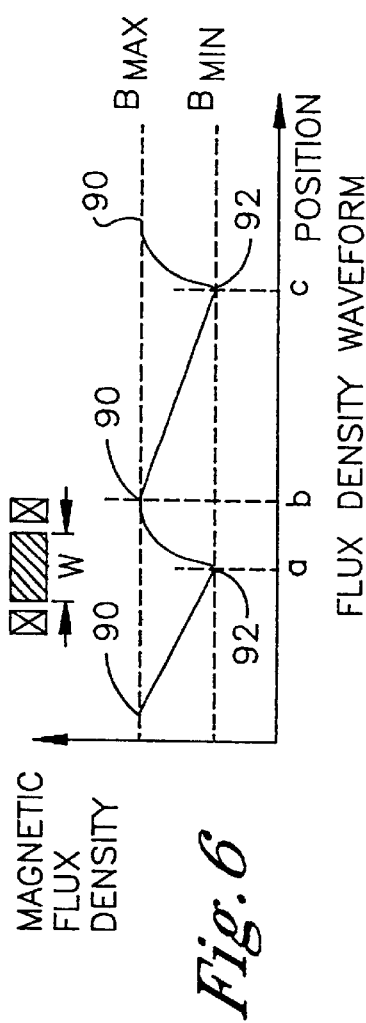
FIG. 6 is a graph of the magnetic flux density sensed by the sensor versus the target wheel position.

FIG. 6 shows a graph of the magnetic flux density sensed by the sensor 12 versus the position of the target wheel 14. FIG. 6 shows that the magnetic flux density asymmetrically cycles from a maximum value 90 to a minimum value 92 without crossing the zero axis. As shown, the slope of the graph leading to the maximum value 90 and the slope of the graph leading to the minimum value 92 are distinctly different—thus, the configuration of the target wheel 14 produces an output that is asymmetric. This asymmetric signal can be used to not only determine the position of the target wheel 14, but also its direction of motion.

Figure 7:
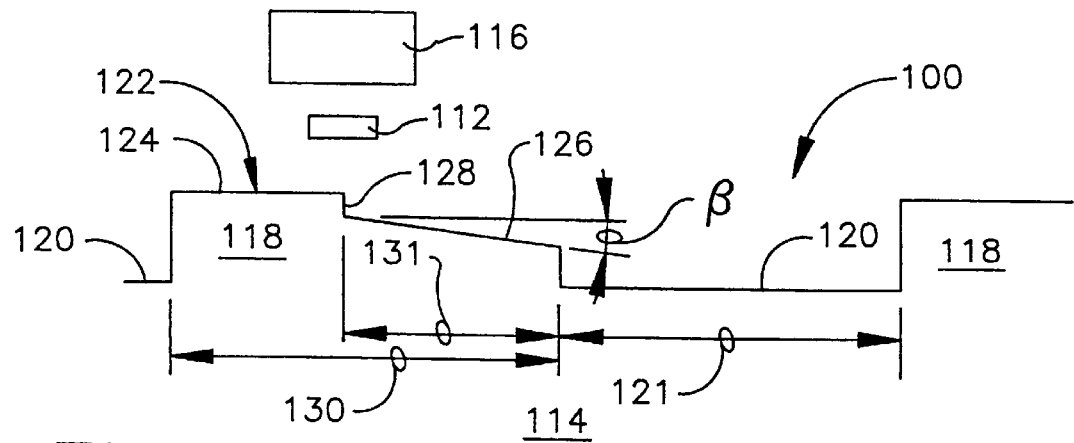
FIG. 7 is an alternative embodiment of the target wheel sensor assembly.

Referring now to FIG. 7, a target wheel sensor assembly is shown and generally designated 100. FIG. 7 shows that the target wheel sensor assembly 100 includes a sensing element 112, e.g., a magnetoresistor (MR) sensor or a Hall effect sensor, placed in close proximity to a preferably metal target wheel 114. As shown in FIG. 7, the sensor assembly 100 includes a preferably permanent magnet 116 placed behind the sensing element 112, i.e., such that the sensing element 112 is between the magnet 116 and the target wheel 114.

FIG. 7 shows that the target wheel 114 is alternatingly formed with multiple teeth 118 and multiple slots 120. Each slot has a length 121. As shown, each tooth 118 includes an outer peripheral tooth surface 122 having a flat portion 124 and a chamfered portion 126. FIG. 7 shows that the flat portion 124 is connected to the chamfered portion 126 by a stepped portion 128. As shown in FIG. 7, the stepped portion 128 is perpendicular to the flat portion 124. The chamfered portion 126 forms an angle, $\beta$, with the bottom of the magnet 116. Moreover, each tooth 118 has an overall length 130 and a chamfer length 131.

As the target wheel 114 rotates, the slots 120 and teeth 118 alternatingly move past the sensing element 112. The configuration of the target wheel 114, described above, causes the sensing element 112 to output a signal having a distinctly asymmetric waveform that is used to detect the direction of motion of the target wheel 114.

Figure 8:
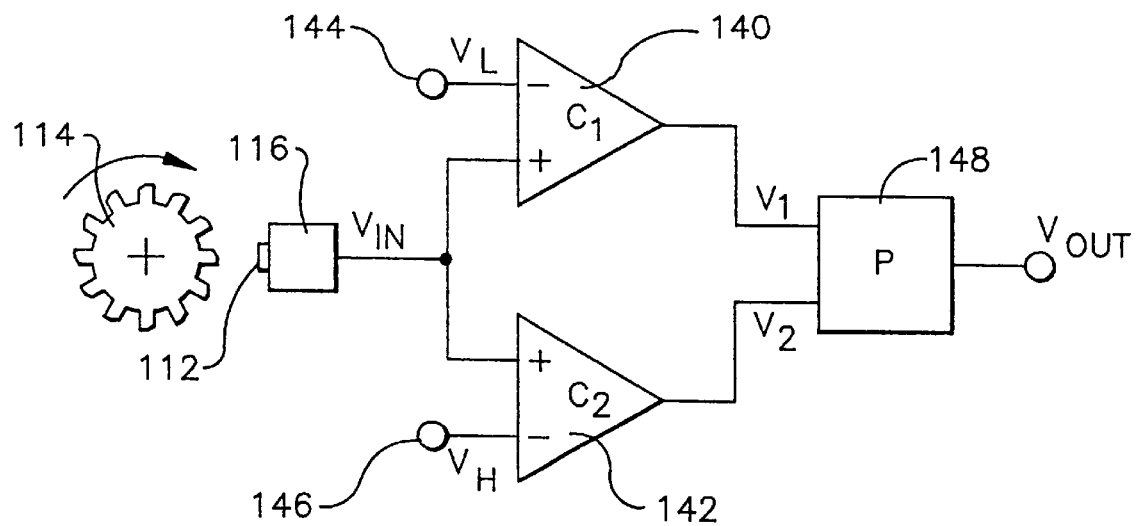
FIG. 8 is a diagram of a circuit for comparing the slopes of the rising and falling signal edges from the target wheel sensor assembly.

FIG. 8 shows a circuit for comparing the slopes of the rising and falling signal edges from the sensing element 112 of the sensor assembly 100. FIG. 8 shows that the sensor assembly 100, specifically the sensing element 112, is connected to a first comparator 140 and a second comparator 142. A first voltage source 144 is connected to the first comparator 140 and provides a relatively low voltage signal, $V_L$, to the first comparator 140 that is slightly above the minimum value of the sensor signal, $V_{in}$. On the other hand, a second voltage source 146 is connected to the second comparator 142 and provides a relatively high voltage signal, $V_H$, that is slightly below the maximum value of the sensor signal, $V_{in}$.

As shown in FIG. 8, the comparators 140, 142 are connected to a processor 148. The comparators 140, 142 generate a pair of nested square wave pulses, $V_1$ and $V_2$. The processor 148 uses the square wave pulses, $V_1$ and $V_2$, to determine which of the rising or falling slopes of $V_{in}$ is steeper by measuring and comparing the time between the two rising edges of the pulses, $V_1$ and $V_2$, with the time between the two falling edges of the pulses, $V_1$ and $V_2$. Based on the comparison, the processor 148 is able to determine the direction of rotation of the target wheel 114. It is to be appreciated that the processor 148 can be a digital signal processor, a microprocessor or a similar device. It is also to be appreciated that at an analog circuit can be used in lieu of the processor 148.

As is well known in the art, MR sensors sense the flux density, e.g., the flux density shown graphically in FIG. 6. On the other hand, VR sensors sense the derivative of the flux density. The derivative of the signal shown in FIG. 6, would have distinct positive and negative peaks which correspond to the steep and not-so-steep slopes of the graph of the flux density shown in FIG. 6. It is to be appreciated that the circuit shown in FIG. 5, works best in conjunction with VR sensors. However, it can be used in conjunction with an MR sensor if the signal from the sensor is differentiated prior to being fed into the circuit.

With the configuration of structure described above, it is to be appreciated that the target wheel sensor assembly 10, 100 can be used to determine the position and direction of motion of a rotating target wheel 14, 114 using only a single sensor 12, 32, 42, 52 or sensing element 112.

While the particular TARGET WHEEL SENSOR ASSEMBLY as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for".

What is claimed is:

1. A system for determining the direction of rotation of a rotating target wheel, comprising:
    a target wheel;
    a sensor placed in close proximity to the target wheel, the sensor outputting an asymmetric signal having different positive and negative peaks as the target wheel rotates; and
    a circuit connected to the sensor and receiving the asymmetric signal, the circuit detecting different positive and negative peaks of the asymmetric signal to determine the direction of motion of the target wheel, the circuit also using the positive and negative peaks of the asymmetric signal to determine the position of the target wheel.

2. The system of claim 1, wherein the circuit comprises:
    at least a first peak detection circuit connected to the sensor;
    at least a second peak detection circuit connected to the sensor;
    at least one inverter circuit connected between the sensor and the second peak detection circuit;
    at least one comparator circuit connected to the first peak detection circuit and the second peak detection circuit; and
    at least one flip-flop circuit connected to the comparator circuit, the flip-flop circuit outputting a signal representing the direction of motion of the target wheel.

3. The system of claim 2, wherein the circuit further comprises:
    at least one zero crossing detection circuit connected to the sensor and the flip-flop circuit.

4. The system of claim 1, wherein the target wheel is configured so that as it rotates it causes the sensor to output the asymmetric signal.

5. The system of claim 1, wherein the target wheel alternatingly forms plural teeth and plural slots, the teeth being configured so that they cause the sensor to output an asymmetric signal as the target wheel rotates.

6. The system of claim 5, wherein the sensor defines a bottom and each tooth forms a flat portion that is parallel to the bottom of the sensor and a chamfered portion contiguous to the flat portion.

7. The system of claim 6, wherein the chamfered portion forms an angle, $\alpha$, with the bottom of the sensor.

8. The system of claim 7, wherein the angle, $\alpha$, is between ten degrees and thirty degrees.

9. The system of claim 5, wherein the sensor defines a width, each tooth and adjacent slot define a pitch, and the ratio of the slot width to the pitch is between 0.3 and 0.9.

10. The system of claim 9, wherein the ratio of the slot width to the pitch is between 0.4 and 0.7.

11. The system of claim 9, wherein the ratio of the slot width to the pitch is between 0.7 and 0.9.

* * * * *